United States Patent
Chowdhury et al.

(10) Patent No.: US 12,294,419 B2
(45) Date of Patent: May 6, 2025

(54) EFFICIENT BEAMSPACE IMAGING IN WIRELESS NETWORKS

(71) Applicant: NOKIA SOLUTIONS AND NETWORKS OY, Espoo (FI)

(72) Inventors: Mainak Chowdhury, Murray Hill, NJ (US); Jinfeng Du, West Windsor, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/772,560

(22) Filed: Jul. 15, 2024

(65) Prior Publication Data

US 2025/0038866 A1    Jan. 30, 2025

(30) Foreign Application Priority Data

Jul. 25, 2023    (FI) ..................................... 20235838

(51) Int. Cl.
*H04B 17/309* (2015.01)
*H04B 7/0413* (2017.01)

(52) U.S. Cl.
CPC ......... *H04B 17/309* (2015.01); *H04B 7/0413* (2013.01)

(58) Field of Classification Search
CPC ............................ H04B 7/0413; H04B 17/309
See application file for complete search history.

(56) References Cited

U.S. PATENT DOCUMENTS

| | | | |
|---|---|---|---|
| 6,404,397 B1 | 6/2002 | Grinberg et al. | |
| 2011/0254727 A1 | 10/2011 | Kam et al. | |
| 2012/0076498 A1* | 3/2012 | Sayeed | H01Q 19/06 398/115 |
| 2018/0159244 A1 | 6/2018 | Tzuang et al. | |
| 2021/0344393 A1 | 11/2021 | Dai et al. | |

OTHER PUBLICATIONS

Giordani et al.; "Standalone and Non-Standalone Beam Management for 3GPP NR at mmWaves;" IEEE Communications Magazine, vol. 57, No. 4; Apr. 2019.
Prather et al.; "Optically-Upconverted, Spatially Coherent Phased Array Antenna Feed Networks for Beam-Space MIMO in 5G Cellular Communications;" IEEE Transactions on Antennas and Propagation, vol. 65, No. 12; Dec. 2017.
Office Action—First Opinion on patentability and Search Report dated Nov. 30, 2023 corresponding to Finnish U.S. Appl. No. 20/235,838.

(Continued)

*Primary Examiner* — Rahel Guarino
(74) *Attorney, Agent, or Firm* — SQUIRE PATTON BOGGS (US) LLP

(57) ABSTRACT

Systems, methods, apparatuses, and computer program products for identifying optimal beamforming directions from a UE by using a beamspace image. One method may include detecting radio frequency energy in a beamspace of one or more lenses; digitizing, with parallel processing of a two-dimensional array, the detected radio frequency energy in the beamspace of the one or more lenses; and generating one or more images based upon the digitized radio frequency energy in the beamspace of the one or more lenses.

13 Claims, 5 Drawing Sheets

(56) References Cited

OTHER PUBLICATIONS

J. Brady et al., "Beamspace MIMO for Millimeter-Wave Communications: System Architecture, Modeling, Analysis, and Measurements," IEEE Transactions on Antennas and Propagation, vol. 61, No. 7, Mar. 22, 2013, pp. 3814-3827.

H. He et al., "Beamspace Channel Estimation for Wideband Millimeter-Wave MIMO: A Model-Driven Unsupervised Learning Approach," IEEE Transactions on Wireless Communications, vol. 22, No. 3, Sep. 22, 2022, pp. 1808-1822.

Communication of Acceptance dated May 2, 2024 corresponding to Finnish U.S. Appl. No. 20/235,838.

3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14), Jun. 2017.

William L. Beardell et al., "Microwave Photonic Direction-Finding Spectrometer," IEEE Journal of Lightwave Technology, 2022.

Xinyu Gao et al., "Reliable Beamspace Channel Estimation for Millimeter-Wave Massive MIMO Systems with Lens Antenna Array," ArXiv: 1707.07624v2, Aug. 24, 2017, https://arxiv.org/pdf/1707.07624.pdf.

Taehoon Kwon et al., "RF Lens-Embedded Massive MIMO Systems: Fabrication Issues and Codebook Design," arXiv: 1510.00252v2, Apr. 15, 2016, https://www.researchgate.net/profile/Yeon-Geun-Lim/publication/282403137_RF_Lens-Embedded_Massive_MIMO_Systems_Fabrication_Issues_and_Codebook_Design/links/57ee261c08ae8da3ce482cb3/RF-Lens-Embedded-Massive-MIMO-Systems-Fabrication-Issues-and-Codebook-Design.pdf.

Sravan Pulipati et al., "Xilinx RF-SoC-based Digital Multi-Beam Array Processors for 28/60 GHz Wireless Testbeds," arXiv:2008.01220v1, Aug. 3, 2020, https://arxiv.org/pdf/2008.01220.pdf.

Extended European Search Report corresponding to EP Application No. 24188684.5, dated Dec. 9, 2024.

* cited by examiner

EFFICIENT BEAMSPACE IMAGING IN WIRELESS NETWORKS

CROSS REFERENCE TO RELATED APPLICATION

This application claims the benefit of Finnish Patent Application No. 20235838, filed Jul. 25, 2023. The entire content of the above-referenced application is hereby incorporated by reference.

TECHNICAL FIELD

Some example embodiments may generally relate to mobile or wireless telecommunication systems, such as $3^{rd}$ Generation Partnership Project (3GPP) Long Term Evolution (LTE), $5^{th}$ generation (5G) radio access technology (RAT), new radio (NR) access technology, $6^{th}$ generation (6G), and/or other communications systems. For example, certain example embodiments may relate to apparatuses and/or methods for identifying optimal beamforming directions from or to a user equipment (UE) by using a beamspace image.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a UE (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include detecting radio frequency energy in a beamspace of one or more lenses. The method may further include digitizing, with parallel processing of a two-dimensional array, the detected radio frequency energy in the beamspace of the one or more lenses. The method may further include generating one or more images based upon the digitized radio frequency energy in the beamspace of the one or more lenses.

In accordance with certain example embodiments, an apparatus may include means for detecting radio frequency energy in a beamspace of one or more lenses. The apparatus may further include means for digitizing, with parallel processing of a two-dimensional array, the detected radio frequency energy in the beamspace of the one or more lenses. The apparatus may further include means for generating one or more images based upon the digitized radio frequency energy in the beamspace of the one or more lenses.

In accordance with various example embodiments, a non-transitory computer readable medium may include program instructions that, when executed by an apparatus, cause the apparatus to perform at least a method. The method may include detecting radio frequency energy in a beamspace of one or more lenses. The method may further include digitizing, with parallel processing of a two-dimensional array, the detected radio frequency energy in the beamspace of the one or more lenses. The method may further include generating one or more images based upon the digitized radio frequency energy in the beamspace of the one or more lenses.

In accordance with some example embodiments, a computer program product may perform a method. The method may include detecting radio frequency energy in a beamspace of one or more lenses. The method may further include digitizing, with parallel processing of a two-dimensional array, the detected radio frequency energy in the beamspace of the one or more lenses. The method may further include generating one or more images based upon the digitized radio frequency energy in the beamspace of the one or more lenses.

In accordance with certain example embodiments, an apparatus may include at least one processor and at least one memory storing instructions that, when executed by the at least one processor, cause the apparatus at least to detect radio frequency energy in a beamspace of one or more lenses. The at least one memory and instructions, when executed by the at least one processor, may further cause the apparatus at least to digitize, with parallel processing of a two-dimensional array, the detected radio frequency energy in the beamspace of the one or more lenses. The at least one memory and instructions, when executed by the at least one processor, may further cause the apparatus at least to generate one or more images based upon the digitized radio frequency energy in the beamspace of the one or more lenses.

In accordance with various example embodiments, an apparatus may include detecting circuitry configured to perform detecting radio frequency energy in a beamspace of one or more lenses. The apparatus may further include digitizing circuitry configured to perform digitizing, with parallel processing of a two-dimensional array, the detected radio frequency energy in the beamspace of the one or more lenses. The apparatus may further include generating circuitry configured to perform generating one or more images based upon the digitized radio frequency energy in the beamspace of the one or more lenses.

In accordance with some example embodiments, a method may include upconverting one or more analog signals in parallel into a radio frequency band of interest based upon one or more images generated via parallel processing in the baseband. The method may further include transforming one or more beamspace signals into one or more beams. The method may further include emitting one or more radio frequency signals.

In accordance with certain example embodiments, an apparatus may include means for upconverting one or more analog signals in parallel into a radio frequency band of interest based upon one or more images generated via parallel processing in the baseband. The apparatus may further include means for transforming one or more beamspace signals into one or more beams. The apparatus may further include means for emitting one or more radio frequency signals.

In accordance with various example embodiments, a non-transitory computer readable medium may include program instructions that, when executed by an apparatus, cause the apparatus to perform at least a method. The method may include upconverting one or more analog signals in parallel into a radio frequency band of interest based upon one or more images generated via parallel processing in the baseband. The method may further include transforming one or more beamspace signals into one or more beams. The method may further include emitting one or more radio frequency signals.

In accordance with some example embodiments, a computer program product may perform a method. The method may include upconverting one or more analog signals in parallel into a radio frequency band of interest based upon one or more images generated via parallel processing in the baseband. The method may further include transforming one or more beamspace signals into one or more beams. The method may further include emitting one or more radio frequency signals.

In accordance with certain example embodiments, an apparatus may include at least one processor and at least one memory storing instructions that, when executed by the at least one processor, cause the apparatus at least to upconvert one or more analog signals in parallel into a radio frequency band of interest based upon one or more images generated via parallel processing in the baseband. The at least one memory and instructions, when executed by the at least one processor, may further cause the apparatus at least to transform one or more beamspace signals into one or more beams. The at least one memory and instructions, when executed by the at least one processor, may further cause the apparatus at least to emit one or more radio frequency signals.

In accordance with various example embodiments, an apparatus may include upconverting circuitry configured to perform upconverting one or more analog signals in parallel into a radio frequency band of interest based upon one or more images generated via parallel processing in the baseband. The apparatus may further include transforming circuitry configured to perform transforming one or more beamspace signals into one or more beams. The apparatus may further include emitting circuitry configured to perform emitting one or more radio frequency signals.

In certain example embodiments, an apparatus may include at least one radio frequency lens configured to perform beamspace transformation on at least one radio frequency signal incident to the at least one radio frequency lens in a pre-defined frequency band to generate radio frequency energy in a beamspace of the lens. The apparatus may further include at least one beamspace array configured to detect radio frequency energy. The apparatus may further include at least one analog-to-digital array configured to generate one or more images based upon the detected beamspace energy. The apparatus may further include at least one baseband processor configured to process one or more images or a time series of at least two images.

In some example embodiments, an apparatus may include at least one analog-to-digital array configured to upconvert one or more analog signals in parallel into a radio frequency band of interest based upon one or more images generated via parallel processing. The apparatus may further include at least one beamspace array configured to transform one or more beamspace signals into one or more beams. The apparatus may further include at least one radio frequency lens configured to emit one or more radio frequency signals.

BRIEF DESCRIPTION OF THE DRAWINGS

For a proper understanding of example embodiments, reference should be made to the accompanying drawings, wherein.

DETAILED DESCRIPTION

Figure 1:
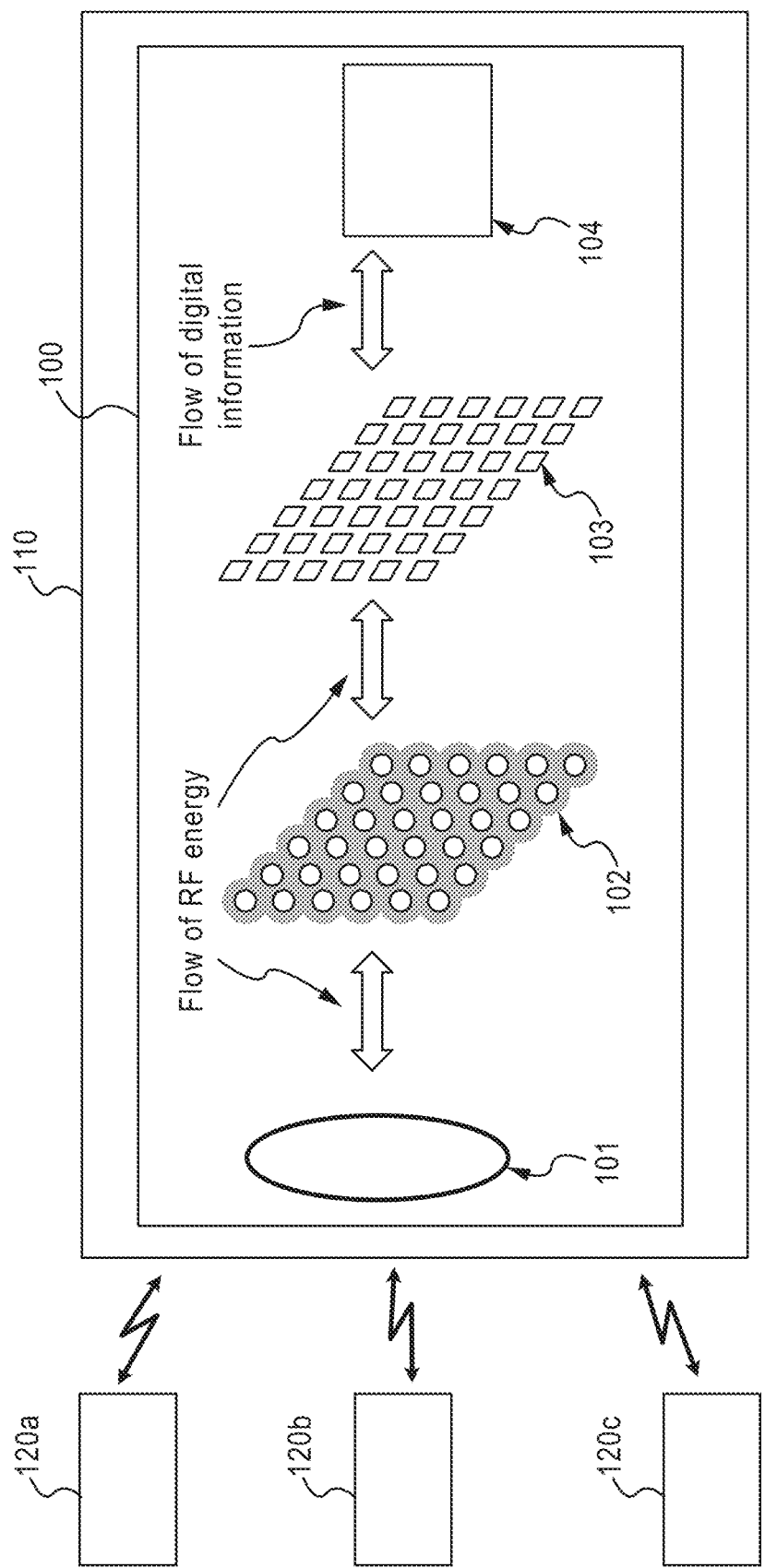
FIG. 1 illustrates a base station including a lens assembly having an architecture configured to perform parallelized operations over a beamspace according to certain example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for identifying optimal beamforming directions from a UE by using one or more beamspace images is not intended to limit the scope of certain example embodiments, but is instead representative of selected example embodiments.

The increased use of extremely high frequency (EHF) bands, such as millimeter wave (mmWave) and sub-terahertz (THz) bands, with ample spectrum has been partially driven by increased demand for higher data rates and area spectral efficiencies. However, using mmWave and sub-THz bands may be accompanied by increasingly worsening path loss, or attenuation, of electromagnetic waves along the path from transmitter to receiver. In an effort to mitigate this path loss, systems that operate in these bands may use highly directional beams. Such highly directional beams can introduce related challenges with beam management, such as channel estimation, beam acquisition, and beam tracking; the challenges can become more pronounced as the beamwidth of the highly directional beam approaches a predefined threshold. In general, narrow beams, e.g., beams having beamwidth less than 5 degrees may be accompanied by prohibitive latencies and a large control channel overhead.

Beam acquisition (e.g., initial beam access) may refer to a base station determining at least one optimal beamforming direction from a particular UE, such as a base station operating with 1024 antennas and 1024 beams. With an average beam-switching time of 10 microseconds (µs), the total latency of sweeping all the beams may be 10.24 milliseconds (ms) if all downlink (DL) transmissions may be used for beam sweeping.

Initial beam access may be challenging when a UE attempts to establish a link with the base station equipped with a large number of antennas. Due to the high path loss, the base station may need to form highly directional beams to establish a link with the UE. However, since the location of the UE in space may initially be unknown, the base station may scan the entire beamspace. This "linear" search over a "codebook" of candidate beams can introduce delay during link establishment. This additional delay can cause latency associated with beam acquisition to become significant for base stations with large arrays where a large number of directional beams may be needed to cover the intended service areas and/or where path loss may be so high that high directional gain (e.g., narrower beam patterns) may be indispensable to close the link budget. Thus, initial access may introduce numerous issues in beam management (e.g., beam tracking), beam selection, and channel estimation.

Certain example embodiments described herein may have various benefits and/or advantages to overcome the disadvantages described above. For example, certain example embodiments may enable parallelized operations over a beamspace, and latencies may be less sensitive to the beamwidth and the number of beams. The same architecture may be configured for both the uplink (UL) and DL directions. Furthermore, initial access latency may be independent of beamwidth, the number of users supported, and/or the number of simultaneous beams per user. Various example embodiments may also conserve energy by using simplified RF circuits that provide energy modulation directly in the RF bands of interest. Thus, certain example embodiments discussed below are directed to improvements in computer-related technology.

Some example embodiments may relate to an architecture for supporting parallelized operations over the beamspace, thereby enabling massive scalability and simultaneous multiplexing both in the beam-domain and user-domain.

Figure 4:
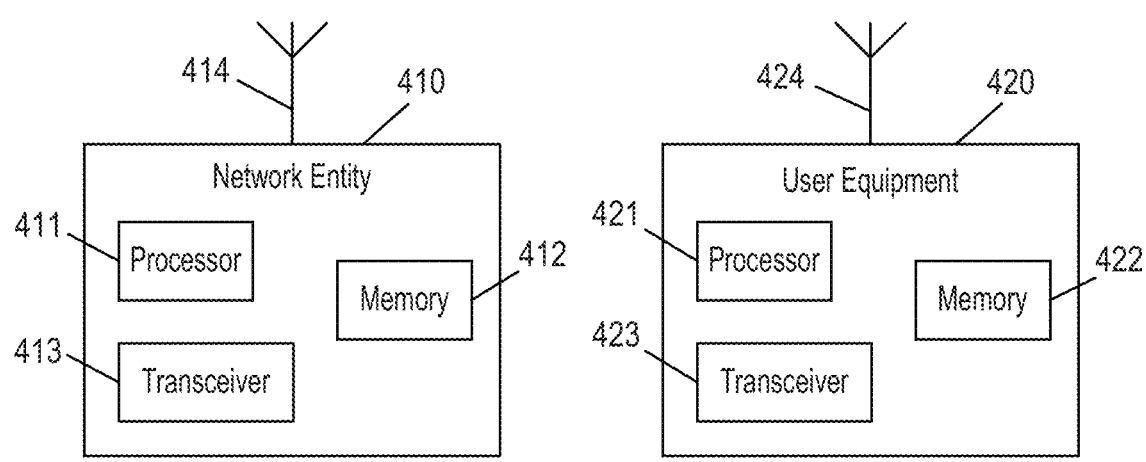
FIG. 4 illustrates an example of various network devices according to some example embodiments.

FIG. 1 illustrates an example of base station 110 and UEs 120a-c, which may be similar to NE 410 and UE 420, respectively, as illustrated in FIG. 4, according to certain example embodiments. Although three UEs (i.e., UEs 120a-c) are depicted, any number of UEs may be included. Base station 110 may include lens assembly 100 in accordance with the present disclosure. The lens assembly 100 may include at least one RF lens 101 configured for a particular band, at least one beamspace array of sensors and/or emitters 102 in the focal plane (e.g., beamspace pixels) configured to detect RF energy, at least one analog-to-digital converter (ADC)/digital-to-analog converter (DAC) array (as well as an array of a plurality of ADC/DAC units) 103 configured to generate one or more images based upon detected beamspace energy, and at least one baseband image/video processing module (hereinafter, baseband processor) 104 configured to process one or more beamspace images or a time-series of a plurality of beamspace images. During reception and/or transmission operations, the array of sensors and/or emitters 102 may be spatially interleaved. The array of sensors and/or emitters 102 may include at least one charged-couple device (CCD) and/or complementary metal-oxide silicon (CMOS) components configured to operate in one or more RF bands of interest. In various example embodiments, the array of sensors and/or emitters 102 and/or the ADC/DAC array 103 may be implemented as a single unit located in the focal plane of the RF lens 101.

In various example embodiments, the RF lens 101 may be configured to operate in one of a continuous aperture operating mode or discrete aperture operating mode. As an example, the RF lens 101 may be configured to perform beamspace transformation on at least one RF signal incident to the RF lens 101 in a pre-defined frequency band to generate RF energy in a beamspace of the RF lens 101. For the continuous aperture operation, the shape of the RF lens 101 may be configured to implement an approximation to the two-dimensional (2D) fast Fourier transform (FFT) operation. In discrete aperture implementations, signal flow graphs designed with the help of butterfly diagrams may be employed to perform highly parallelized discrete Fourier transforms. In analog implementations of signal flow graphs, phase shifters or delay lines may be used to implement multiplication by exponentials, whereas operational amplifier/transistor-based amplifier circuits may be used for analog addition. Forward and inverse Fourier transforms corresponding to UL and DL operations, respectively, may operate either according to a time-division schedule or in a full-duplex fashion.

In the UL direction, RF energy may flow through the lens assembly 100 from the RF lens 101 to the baseband processor 104. The RF lens 101 may be configured to perform a 2D Fourier transform by transforming the RF signal from an angular domain to a beamspace. In a focal plane of the RF lens 101, the signal may be sampled using one or more sensors of the array of sensors and/or emitters 102. By digitally sampling the beamspace in parallel, the lens assembly 100 may be configured to reduce latency of searching the beamspace during initial access, e.g., from multiple milliseconds to microseconds, regardless of protocol, beamwidth, and the number of users and beams. The beamspace array may be configured to perform energy detection of a passband signal at each beamspace pixel. At least one ADC unit in the ADC/DAC array 103 may determine a modulated signal at the baseband sampling rate, which may be lower than a given frequency (e.g., Nyquist rate) for the passband or the intermediate frequency (IF) signals. Using energy detectors without phase detectors in the array of sensors and/or emitters 102 may lower the average energy consumption per beamspace pixel. The beamspace array may be configured to detect one or more beamspace signals.

Alternatively, in the DL direction, RF energy may flow through the lens assembly 100 from the baseband processor 104 to the RF lens 101. In certain example embodiments, the baseband processor 104 may be configured to modulate a stream of bits intended for one or more active UEs to at least one beamspace image, which may be transmitted via the DAC array 103 to one or more emitters of the emitter array 102. The at least one beamspace image may then be interleaved with the sensor and/or emitter array 102 in the focal plane. The emitter pixels of the sensor and/or emitter array 102 may be configured to upconvert the signal to the band of operation. The RF lens 101 may receive and transform the signal via FFT to the spatial domain for further transmission. The emitter pixels may be configured to upconvert the baseband energy signal directly to passband RF (e.g., by using RF diodes biased according to the modulating signal coming from the DAC unit of the ADC/DAC array 103 associated with the emitter pixel). Directly modulating a passband signal with the energy-modulated baseband signal may conserve energy by obviating mixer circuits in status quo millimeter-wave systems, thereby improving the transceiver energy efficiency. ADC/DAC array 103 may be configured to upconvert one or more analog signals in parallel into a radio frequency band of interest based upon one or more images generated via parallel processing. RF lens 101 may be configured to emit one or more radio frequency signals.

In some example embodiments, the baseband processor 104 may be implemented using any combination of central processing unit (CPU), graphics processing unit (GPU), application-specific integrated circuit (ASIC), field programmable gate array (FPGA), and/or system-on-chip (SoC).

Figure 2:
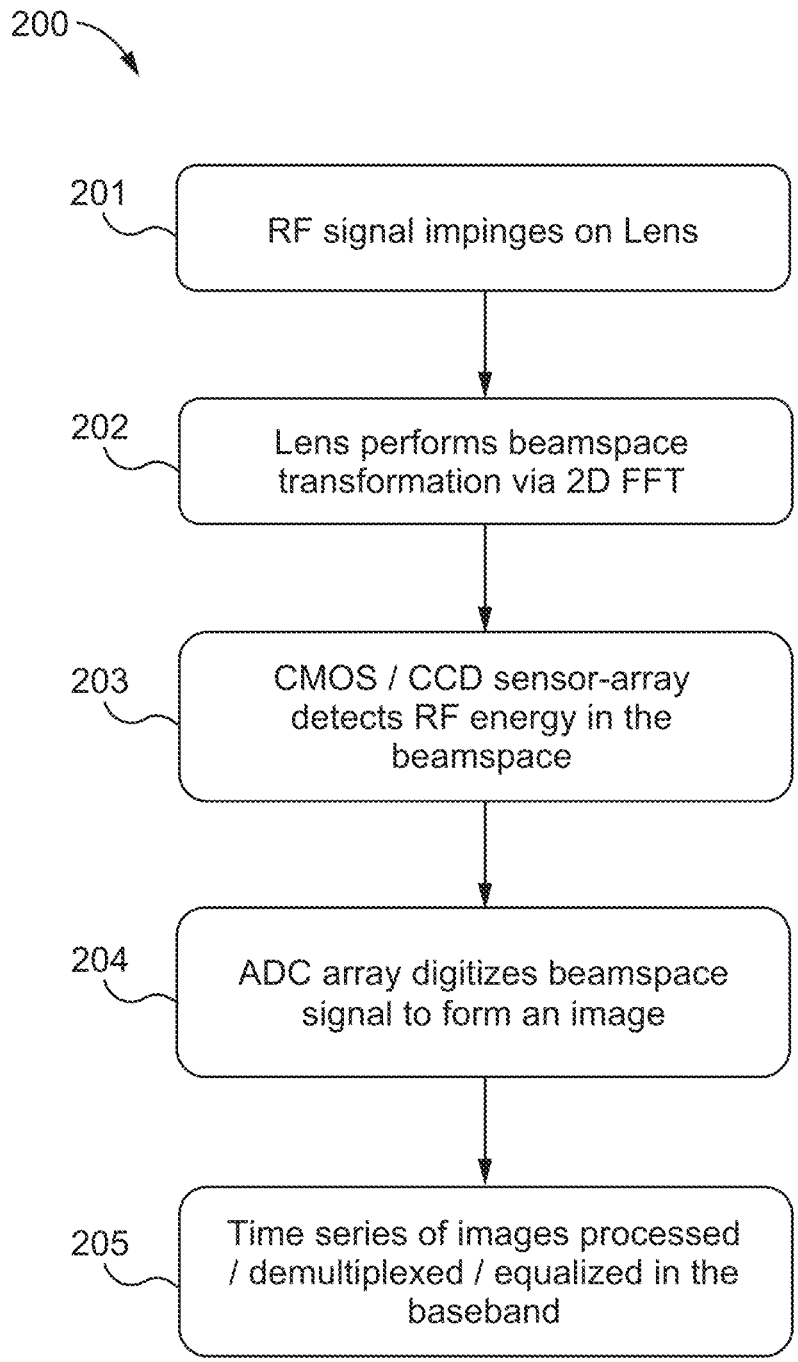
FIG. 2 illustrates an example of a flow diagram of a method for beamspace imaging in the uplink direction according to some example embodiments.

FIG. 2 illustrates an example method 200 that may be performed by a lens assembly, such as the lens assembly 100 depicted in FIG. 1. FIG. 2 depicts an RF energy detection (e.g., non-coherent detection) method.

At step 201, the method may include receiving at least one RF signal (e.g., at an RF lens). For example, the at least one RF signal in a band of operation may be incident on the lens assembly, and may be similar to background noise.

At step 202, the method may further include performing at least one beamspace transformation (e.g., by the RF lens), which may be performed via 2D FFT. In certain example embodiments, the one or more beamspace transformations may be performed via one or more of a two-dimensional fast Fourier transform, a meta-surface array, a passive lens antenna, or other spatial-to-beam conversion method.

At step 203, the method may further include detecting RF energy in at least one beamspace signal of one or more RF lenses. For example, the detecting may be performed by a CMOS and/or CCD sensor array.

At step 204, the method may further include digitizing, with parallel processing of a two-dimensional array of the detected RF energy, the detected RF energy in the at least one beamspace signal and forming at least one image. In various example embodiments, the digitizing may be performed by an ADC.

At step 205, the method may further include generating and processing at least one image or a time series of at least two images in the baseband based upon the digitized RF energy in the beamspace of the one or more lenses. For example, the one image or the time series of at least two images may be demultiplexed and/or equalized. The equalizing may include decoding at least one multi-user transmission into at least one individual symbol or bit.

Figure 3:
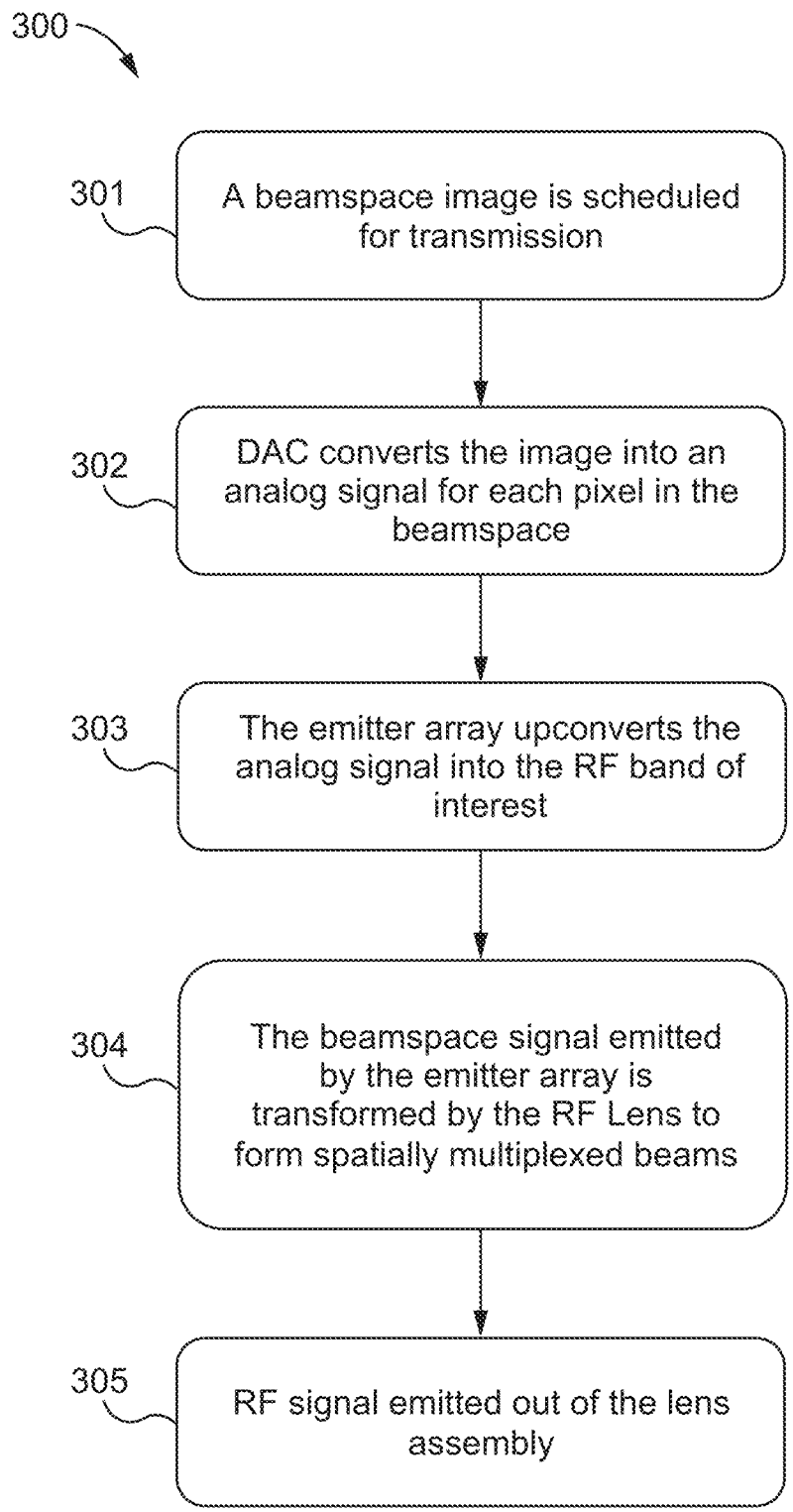
FIG. 3 illustrates an example of a flow diagram of a method for leveraging beamspace images in the downlink direction according to various example embodiments.

FIG. 3 illustrates an example of a flow diagram of a method 300 that may be performed by a lens assembly, such as the lens assembly 100 depicted in FIG. 1.

At step 301, the method may include scheduling at least one beamspace image generated via parallel processing for transmission.

At step 302, the method may further include converting the at least one beamspace image into at least one analog signal for each pixel in the at least one beamspace. The converting may be performed by a DAC.

At step 303, the method may further include upconverting the at least one analog signal in parallel into at least one RF band of interest based upon one or more images generated via parallel processing in a baseband processor. In various example embodiments, the upconverting may be performed by an emitter array. In various example embodiments, the baseband processor may generate an image (i.e., a 2D array whose elements may be analog signals), wherein each pixel of the generated image may be upconverted to a RF signal.

At step 304, the method may further include transforming one or more beamspace signals emitted by an emitter array into one or more beams, and forming at least one spatially multiplexed beam. The transforming may be performed by an RF lens.

At step 305, the method may further include emitting one or more RF signals, which may be performed by a lens assembly.

In various example embodiments, the UE may transmit signals simultaneously (e.g., UL) prior to establishing a link. Furthermore, each UE may transmit a particular pattern of ON-OFF signaling according to a codebook that may be known (or otherwise accessible) to the base station beforehand. The base station may listen to the UL signals, and detect beamspace activity patterns for each UE. Once detected, the base station may communicate the information to the UE in the DL. Temporal coding may be used according to the same ON-OFF pattern that may or may not be unique to each UE transmitter.

FIG. 4 illustrates an example of a system according to certain example embodiments. In one example embodiment, a system may include multiple devices, such as, for example, NE 410 and/or UE 420.

NE 410 may be one or more of a base station (e.g., 3G UMTS NodeB, 4G LTE Evolved NodeB, or 5G NR Next Generation NodeB), a serving gateway, a server, and/or any other access node or combination thereof.

NE 410 may further include at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a $5^{th}$ generation core (5GC) or 6G core.

UE 420 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, NE 410 and/or UE 420 may be one or more of a citizens broadband radio service device (CBSD).

NE 410 and/or UE 420 may include at least one processor, respectively indicated as 411 and 421. Processors 411 and 421 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 412 and 422. The memory may be fixed or removable. The memory may include computer program instructions or computer code contained therein. Memories 412 and 422 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 411 and 421, memories 412 and 422, and any subset thereof, may be configured to provide means corresponding to the various blocks of FIGS. 1-3. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 4, transceivers 413 and 423 may be provided, and one or more devices may also include at least one antenna, respectively illustrated as 414 and 424. The device may have many antennas, such as an array of antennas configured for multiple input multiple output (MIMO) communications, or multiple antennas for multiple RATs. Other configurations of these devices, for example, may be provided. Transceivers 413 and 423 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-3). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-3. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 5:
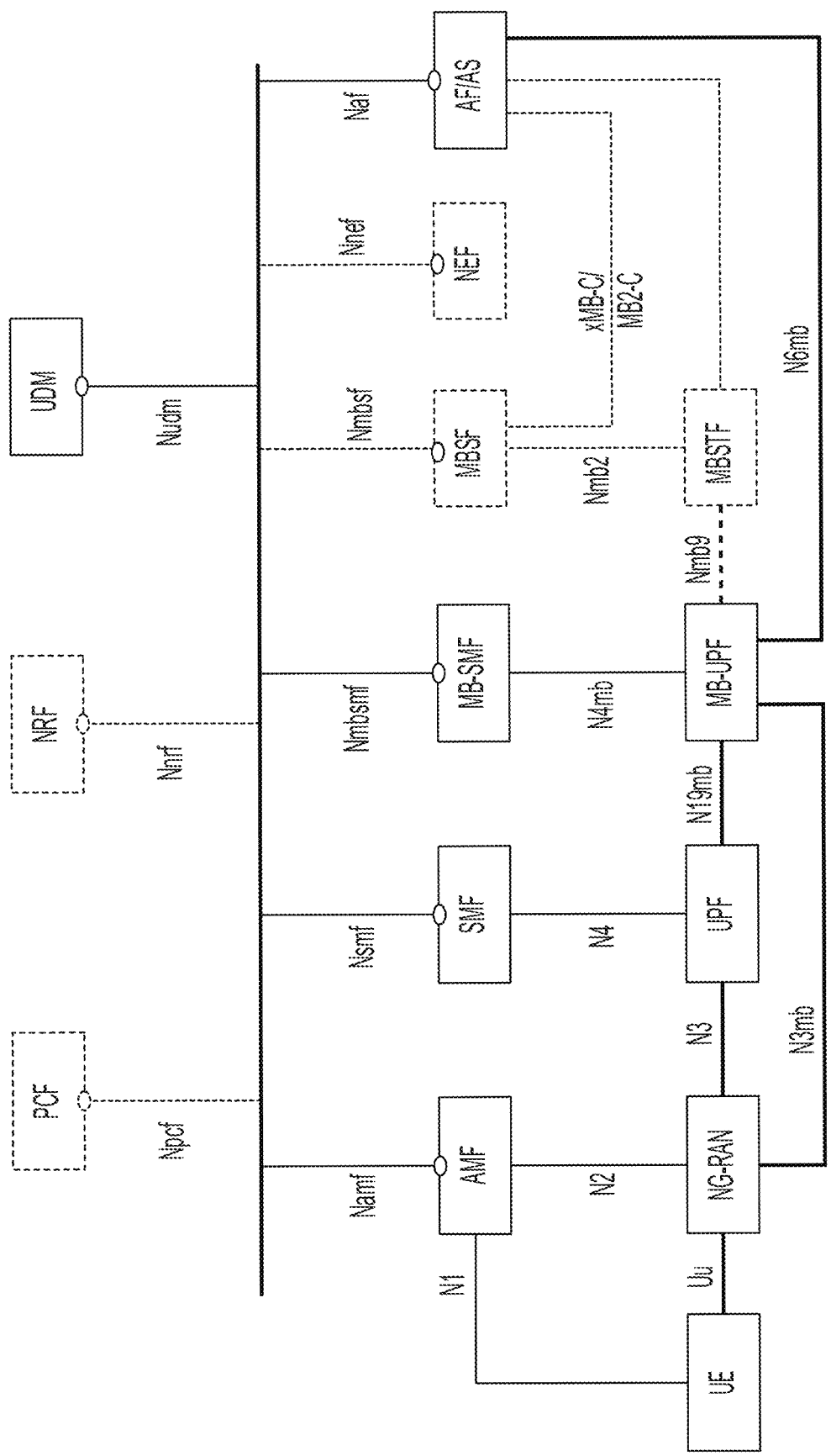
FIG. 5 illustrates an example of a 5G network and system architecture according to certain example embodiments.

FIG. 5 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 5 may be similar to NE 410 and UE 420, respectively. The user plane function (UPF) may provide services such as intra-RAT and inter-RAT mobility, routing and forwarding of data packets, inspection of packets, user plane quality of service (QoS) processing, buffering of DL packets, and/or triggering of DL data notifications. The application function (AF) may primarily interface with the core network to facilitate application usage of traffic routing and interact with the policy framework.

According to certain example embodiments, processors 411 and 421, and memories 412 and 422, may be included in or may form a part of processing circuitry or control circuitry. In addition, in some example embodiments, transceivers 413 and 423 may be included in or may form a part of transceiving circuitry.

In some example embodiments, an apparatus (e.g., NE 410 and/or UE 420) may include means for performing a method, a process, or any of the variants discussed herein. Examples of the means may include one or more processors, memory, controllers, transmitters, receivers, and/or computer program code for causing the performance of the operations.

In various example embodiments, apparatus 420 may be controlled by memory 422 and processor 421 to detect radio frequency energy in a beamspace of one or more lenses; digitize, with parallel processing of a two-dimensional array, the detected radio frequency energy in the beamspace of the one or more lenses; and generate one or more images based upon the digitized radio frequency energy in the beamspace of the one or more lenses.

Certain example embodiments may be directed to an apparatus that includes means for performing any of the methods described herein including, for example, means for detecting radio frequency energy in a beamspace of one or more lenses; means for digitizing, with parallel processing of a two-dimensional array, the detected radio frequency energy in the beamspace of the one or more lenses; and means for generating one or more images based upon the digitized radio frequency energy in the beamspace of the one or more lenses.

In various example embodiments, apparatus 420 may be controlled by memory 422 and processor 421 to upconvert one or more analog signals in parallel into a radio frequency band of interest based upon one or more images generated via parallel processing in the baseband; transform one or more beamspace signals into one or more beams; and emit one or more radio frequency signals.

Certain example embodiments may be directed to an apparatus that includes means for performing any of the methods described herein including, for example, means for upconverting one or more analog signals in parallel into a radio frequency band of interest based upon one or more images generated via parallel processing in the baseband; means for transforming one or more beamspace signals into one or more beams; and means for emitting one or more radio frequency signals.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

We claim:

1. A method comprising:
detecting radio frequency energy without phase detection at all pixels in a beamspace of one or more lenses;
digitizing, with parallel processing of a two-dimensional array, the detected radio frequency energy in the beamspace of the one or more lenses; and
generating one or more images based upon the digitized radio frequency energy in the beamspace of the one or more lenses.

2. The method of claim 1, further comprising:
receiving one or more radio frequency signals.

3. The method of claim 1, further comprising:
performing one or more beamspace transformations.

4. The method of claim 3, wherein the one or more beamspace transformations are performed via one or more of a two-dimensional fast Fourier transform, a meta-surface array, a passive lens antenna, or other spatial-to-beam conversion method.

5. The method of claim 1, further comprising:
processing one or more images or time series of at least two images in a baseband.

6. The method of claim 5, wherein the processing comprises one or more of the following: demultiplexing or equalizing.

7. The method of claim 6, wherein the equalizing comprises decoding one or more multi-user transmissions into one or more individual symbols or bits.

8. A method comprising:
upconverting a plurality of analog signals in parallel directly into a radio frequency band of interest based upon a plurality of images generated via parallel processing in the baseband;
transforming one or more beamspace signals into one or more beams; and
emitting one or more radio frequency signals.

9. The method of claim 8, further comprising:
scheduling one or more images generated via parallel processing for transmission.

10. The method of claim 8, further comprising:
converting the one or more beamspace images into an analog signal for each of one or more pixels in the one or more beamspace images.

11. The method of claim 1, further comprising:
searching the beamspace during initial access between a user equipment and a base station.

12. An apparatus comprising:
at least one radio frequency lens configured to perform beamspace transformation on at least one radio frequency signal incident to the at least one radio frequency lens in a pre-defined frequency band to generate radio frequency energy in a beamspace of the lens;
at least one beamspace array configured to detect radio frequency energy without phase detection at all pixels in the beamspace;
at least one analog-to-digital array configured to generate one or more images based upon the detected beamspace energy; and
at least one baseband processor configured to process one or more images or a time series of at least two images.

13. An apparatus comprising:
at least one digital-to-analog array configured to upconvert a plurality of analog signals in parallel directly into a radio frequency band of interest based upon a plurality of images generated via parallel processing;
at least one beamspace array configured to transform one or more beamspace signals into one or more beams; and
at least one radio frequency lens configured to emit one or more radio frequency signals.

* * * * *